United States Patent
Shirai et al.

(10) Patent No.: US 9,895,784 B2
(45) Date of Patent: Feb. 20, 2018

(54) SPINDLE APPARATUS FOR MACHINE TOOL

(71) Applicant: DMG MORI SEIKI CO., LTD., Nara (JP)

(72) Inventors: Yuya Shirai, Shiga (JP); Tatsuhiko Kuriya, Osaka (JP)

(73) Assignee: DMG MORI SEIKI CO., LTD., Yamatokoriyama-shi, Nara (JP)

( * ) Notice: Subject to any disclaimer, the term of this patent is extended or adjusted under 35 U.S.C. 154(b) by 0 days.

(21) Appl. No.: 14/671,294

(22) Filed: Mar. 27, 2015

(65) Prior Publication Data

US 2015/0273643 A1 Oct. 1, 2015

(30) Foreign Application Priority Data

Mar. 28, 2014 (JP) .................. 2014-068767

(51) Int. Cl.
*B23Q 11/10* (2006.01)
*B23Q 11/12* (2006.01)

(52) U.S. Cl.
CPC ......... *B23Q 11/127* (2013.01); *Y10T 82/2552* (2015.01)

(58) Field of Classification Search
CPC ....... Y10T 409/303976; Y10T 82/2552; Y10T 409/304032; B23Q 11/0003; B23Q 11/12; B23Q 11/123; B23Q 11/127; B23Q 11/128; B23Q 11/14; B23Q 11/141
See application file for complete search history.

(56) References Cited

U.S. PATENT DOCUMENTS

| 5,664,916 A * | 9/1997 | Link .................. B23Q 1/70 310/54 |
| 6,834,997 B2 * | 12/2004 | Uesugi .............. F16C 33/107 384/100 |
| 6,861,625 B1 * | 3/2005 | Haimer ............. B23B 31/1179 219/221 |

(Continued)

FOREIGN PATENT DOCUMENTS

| DE | 102010002804 A1 * | 9/2011 | ............ B23B 9/005 |
| JP | H07-31253 U | 6/1995 | |

(Continued)

OTHER PUBLICATIONS

MacMillan Dictionary Online, http://www.macmillandictionary.com/us/dictionary/american/box_1.*

(Continued)

*Primary Examiner* — Will Fridie, Jr.
(74) *Attorney, Agent, or Firm* — IP Business Solutions, LLC

(57) ABSTRACT

A cooling medium accumulation part is integrally formed with a spindle housing and an attaching section between the spindle housing and the attaching section so that at least a width of the cooling medium accumulation part in a direction perpendicular to the spindle is wider than a width of the motor accommodation section in a virtual projection plane obtained by projecting the cooling medium accumulation part in a direction from the spindle housing to the attaching section. A straight oil supply through-holes communicating the cooling medium accumulation part and the cooling passages are formed in a side wall part of the spindle housing.

10 Claims, 13 Drawing Sheets

(56) References Cited

U.S. PATENT DOCUMENTS

| | | | |
|---|---|---|---|
| 7,204,004 B2 * | 4/2007 | Hashimoto | B23Q 39/028 29/27 C |
| 2005/0047881 A1 * | 3/2005 | Dallinger | B23Q 1/01 408/128 |
| 2008/0302208 A1 * | 12/2008 | Yonenaga | B23Q 11/141 74/813 R |

FOREIGN PATENT DOCUMENTS

| | | | | |
|---|---|---|---|---|
| JP | H11-48087 A | | 2/1999 | |
| JP | 2000042864 A | * | 2/2000 | B23Q 11/12 |
| JP | 2006-263862 A | | 10/2006 | |

OTHER PUBLICATIONS

English Abstract and Machine Translation for JPH11-48087, Publication Date: Feb. 23, 1999.

* cited by examiner (REAR VIEW)

SPINDLE APPARATUS FOR MACHINE TOOL

CROSS-REFERENCE TO RELATED APPLICATIONS

The present application claims priority under 35 U.S.C. 119 to Japanese Patent Application No. 2014-068767, filed on Mar. 28, 2014, the content of which is incorporated herein by reference in its entirety.

BACKGROUND OF THE INVENTION

Field of the Invention

The present disclosure relates to a spindle apparatus for a machine tool, and more specifically relates to an improvement of a cooling structure for cooling a periphery of a motor which rotatably drives a spindle.

Description of the Related Art

The following description of related art sets forth the inventors' knowledge of related art and certain problems therein and should not be construed as an admission of knowledge in the prior art.

A spindle apparatus of this kind is provided with a cooling structure for cooling a periphery of a motor to avoid adverse influences to processing precision due to heat generation of a motor which rotatably drives a spindle. For example, in Japanese Unexamined Patent Application Publication No. 11-48087 (Patent Document 1), a ventilation fan is provided in an upper opening of a headstock to suck air around a bed through an air inlet of the bed and discharge it upward through the upper opening by passing the air through a cooling space surrounding a stator via a lower opening of a headstock fixing section.

In the meantime, it is generally difficult to integrally form a headstock having a motor accommodation section and a cooling medium accumulation part so as to include cooling passages for cooling a motor. For this reason, in the cooling structure of Patent Document 1, the headstock fixing section having a lower opening and a headstock main body having a cooling space are produced separately and then assembled. This causes a problem that the production cost arises.

Further, in the conventional structure of Patent Document 1, air is sucked from an air suction opening of a bed and discharged upward from the upper opening by passing from the lower opening of the headstock fixing section through a cooling space surrounding the stator. In other words, a cooling fluid is merely moved upward from the lower section of the headstock. Therefore, the supply quantity of the cooling fluid tends to become uneven especially in the axial direction of the motor. This raises a concern that the periphery of the motor cannot be cooled evenly.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of the present invention have been developed in view of the above-mentioned and/or other problems in the related art. The disclosed embodiments of the present invention can significantly improve upon existing methods and/or apparatuses.

The embodiments of the present invention has been made in view of the conventional circumstances, and aim to provide a spindle apparatus for a machine tool capable of reducing a production cost by integrally forming a headstock and reducing adverse influences to processing precision by preventing supply unevenness of a cooling medium to reduce thermal displacement.

In some embodiments of the present invention, a spindle apparatus of a machine tool includes a motor configured to rotatably drive a spindle, a motor accommodation section having a cylindrical inner wall surface configured to accommodate the motor; and a headstock including a spindle housing fixed to an outer wall surface of the motor accommodation section so as to surround the outer wall surface to form a cooling passage for passing a cooling medium between an inner wall surface of the spindle housing and the outer wall surface of the motor accommodation section and an attaching section configured to be attached to a moving member or a fixed member. A cooling medium accumulation part is integrally formed with the spindle housing and the attaching section between the spindle housing and the attaching section so that at least a width of the cooling medium accumulation part in a direction perpendicular to the spindle is wider than a width of the motor accommodation section in a virtual projection plane obtained by projecting the cooling medium accumulation part in a direction from the spindle housing to the attaching section. A a straight through-hole communicating the cooling medium accumulation part and the cooling passage directly or via a connection aperture is formed in a side wall part of the spindle housing.

In one embodiment of the spindle apparatus of a machine tool, the through-hole is formed at four positions symmetrical to a first vertical plane perpendicular to the virtual projection plane and including an axis of rotation of the motor and also symmetrical to a second vertical plane perpendicular to the first vertical plane and perpendicular to the virtual projection plane.

In one embodiment of the spindle apparatus of a machine tool, the cooling passage is formed so as to diverge at an intermediate portion of the through-hole, and one end portion of the through-hole is opened in a direction of separating from the cooling medium accumulation part. A sealing member for sealing the opening is arranged in the opening.

In one embodiment of the spindle apparatus of a machine tool, discharge ports for discharging the cooling medium are formed at portions on the second vertical plane and symmetrical to the first vertical plane, or positions symmetrical to both the second vertical plane and the first vertical plane.

In one embodiment, since the cooling passage is formed between the outer wall surface of the motor accommodation section and the inner wall surface of the spindle housing surrounding the outer wall surface of the motor accommodation section, the configuration of the cooling passage, the path, etc., are not limited to a specific one, and the degree of freedom of the cooling passage design can be improved.

Further, in one embodiment, since the cooling medium accumulation part is formed between the spindle housing and the attaching section so that at least the width dimension of the cooling medium accumulation part perpendicular to the spindle is larger than a width dimension of the motor accommodation section, by arranging the through-hole which will be explained later, the cooling medium accumulation part can be communicated with the cooling passage, and the storage capacity of the cooling medium can be increased, which in turn can restrain the thermal expansion of the attaching section of the headstock. Further, especially, since the motor accommodation section is directly cooled from the cooling medium accumulation part side, the temperature raise of the cooling medium accumulation part side of the spindle, or the thermal displacement, can be suppressed, which in turn can suppress adverse effects to processing precision.

Further, in one embodiment, the headstock is structured such that the cooling medium accumulation part is integrally formed between the spindle housing and the attaching section, and the straight through-hole communicating the cooling medium accumulation part and the cooling passage is formed in the side wall part of the spindle housing.

Therefore, by merely integrally forming the headstock by casting, forming the through-hole in the side wall part of the headstock by machining, etc., and assembling the motor accommodation section in which the spindle and the motor are assembled in the spindle housing of the headstock, the spindle apparatus can be structured without causing complication of the mold structure, which in turn can improve the productivity.

In one embodiment, since the through-hole is formed at four positions symmetrical to the first vertical plane perpendicular to the virtual projection plane and also symmetrical to the second vertical plane, the cooling passage can be formed into four systems and the cooling medium can be evenly supplied to each system. Especially, the thermal distribution in the direction of axis of the motor accommodation section and the positional relation symmetrical to the first vertical plane, or the thermal displacement, will become even, which can reduce influences to processing precision.

In one embodiment, the cooling passage is diverged in the middle of the through-hole, and the one end portion of the through-hole is opened in a direction of separating from the cooling medium accumulation part. Therefore, the through-hole can be easily and assuredly formed by machining, which can prevent complication of the mold structure.

Further, since the sealing member for sealing the opening of the through-hole is arranged in the opening, by arranging the sealing member after filling the through-hole with the cooling medium, or setting the sealing member to have a length reaching the diverging point of the cooling passage, the amount of stagnated air in the through-hole can be reduced, stabilizing the flow of the cooling medium, which in turn can secure a stable cooling function.

In one embodiment, the discharge portion for discharging the cooling medium is formed at portions on the second vertical plane and symmetrical to the first vertical plane, or at positions symmetrical to both the second vertical plane and the first vertical plane. Therefore, the discharge of the cooling medium in each system can also be made even. From this viewpoint, the cooling medium can be supplied evenly to each system, resulting in uniform temperature distribution of the motor accommodation section, or the thermal displacement, which in turn can reduce influences to processing precision.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims. In the drawings, the size and relative sizes of layers and regions may be exaggerated for clarity. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/". It will be understood that, although the terms first, second, etc. may be used herein to describe various elements, these elements should not be limited by these terms. Unless indicated otherwise, these terms are only used to distinguish one element from another. For example, a first object could be termed a second object, and, similarly, a second object could be termed a first object without departing from the teachings of the disclosure. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise. Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

BRIEF DESCRIPTION OF THE DRAWINGS

The disclosed embodiments of the present invention are shown by way of example, and not limitation, in the accompanying figures.

DETAILED DESCRIPTION

Figure 1:
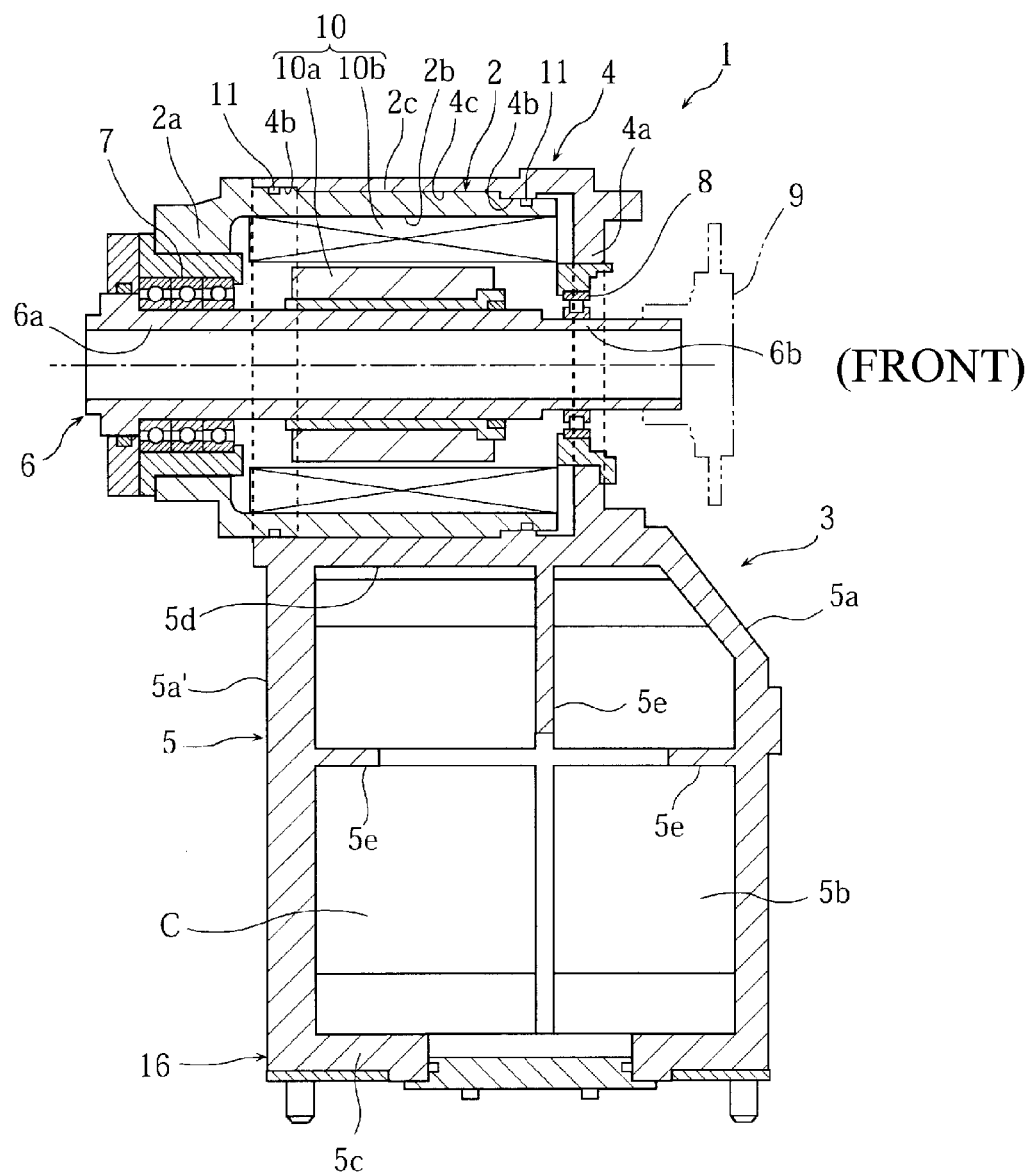
FIG. 1 is a side cross-sectional view of a spindle apparatus for a machine tool according to Embodiment 1 of the present invention.
Figure 2:
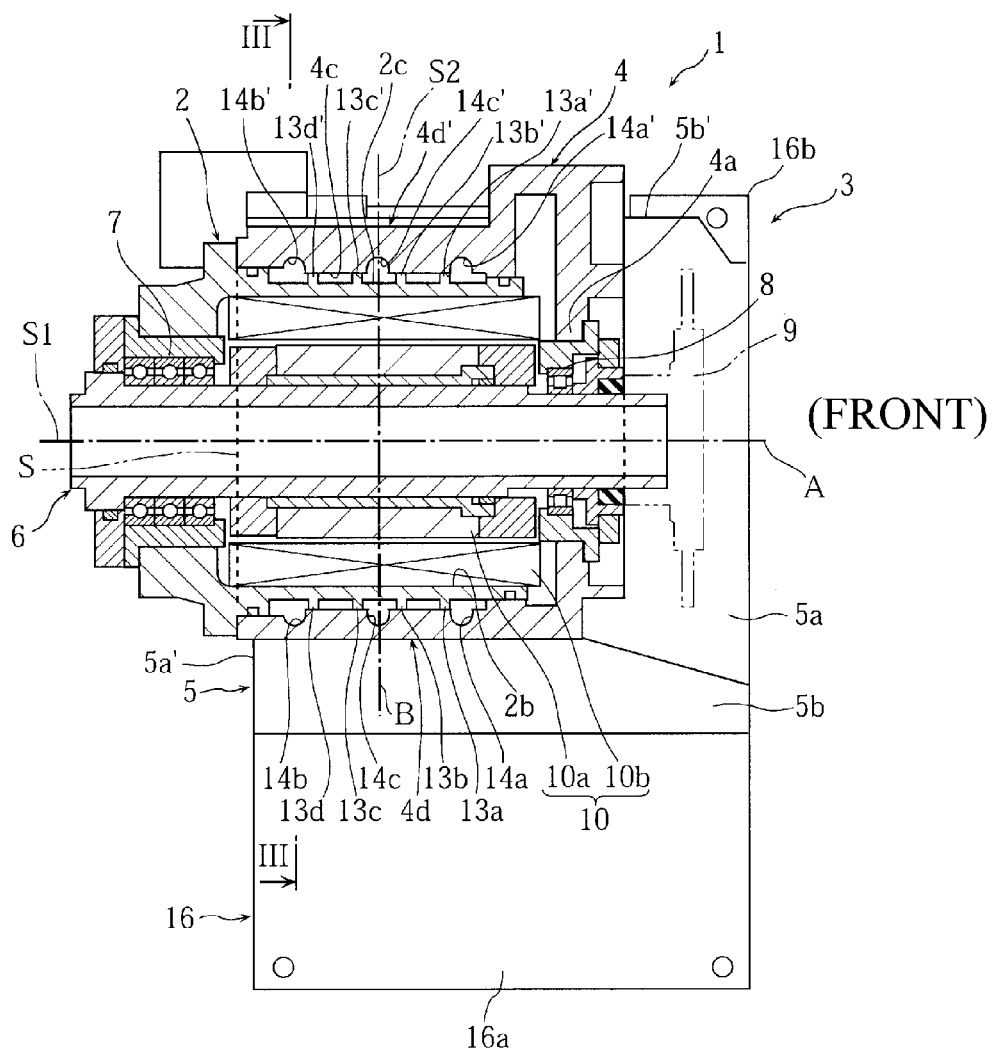
FIG. 2 is a plan cross-sectional view of the spindle apparatus.

In the following paragraphs, some embodiments of the invention will be described by way of example and not limitation. It should be understood based on this disclosure that various other modifications can be made by those in the art based on these illustrated embodiments.

Hereinafter, embodiments of the present invention will be explained based on the attached drawings.

Embodiment 1

FIGS. 1 to 7 are drawings for explaining a spindle apparatus for a machine tool according to Embodiment 1 of the present invention. In this embodiment, the chuck side will be referred to as a machine front side, and when seen from the machine front side, the near side, far side, left side, and right side will be respectively referred to as a front side, the rear side, the left side, and the right side.

In the figures, the reference symbol "1" denotes a spindle apparatus fixedly arranged on a bed (not illustrated) for a lathe (machine tool), and the spindle apparatus 1 is equipped with a motor accommodation section 2 for accommodating a motor 10 and a headstock 3.

The headstock 3 is constituted by a spindle housing 4 in which the motor accommodation section 2 is mounted, an attaching section 16 for attaching the headstock 3 to a bed, and a cooling oil accumulation part (cooling medium accumulation part) 5 integrally casted so as to be positioned between the attaching section 16 and the spindle housing 4 and configured to accumulate a cooling oil (cooling medium) C.

The motor accommodation section 2 is a cast product formed into a substantially cylindrical shape, and has a spindle 6 inserted therein. The rear section 6a (left end section in FIG. 1) of this spindle 6 is rotatably supported by a bearing section 2a of the motor accommodation section 2 via a bearing 7. Further, the front section (right end section in FIG. 1) of this spindle 6 is rotatably supported by a bearing section 4a of the spindle housing 4 via a bearing 8. The reference symbol "9" is a chuck attached to a front end section 6b of the spindle 6.

Further, the motor 10 of a built-in type is arranged between the spindle 6 and the motor accommodation section 2. This motor 10 includes a rotor 10a fixed to an outer periphery of the spindle 6 and a stator 10b fixed to an inner wall surface 2b of the motor accommodation section 2.

The headstock 3 is a cast product in which the spindle housing 4, the cooling oil accumulation part 5 and the attaching section 16 are integrally formed as explained above. The inner wall surface 4c of the spindle housing 4 is formed into a circular shape corresponding to a cylindrical shape of the motor accommodation section 2. On this inner wall surface 4c, connecting section 4b to which the front and rear sections of the circular outer wall surface 2c of the motor accommodation section 2 are press-fitted are formed, so that the motor accommodation section 2 is fixedly and coaxially supported to the spindle housing 4. Further, between the connecting section 4b and the outer wall surface 2c, sealing members 11 for preventing leakage of the cooling oil is arranged.

Figure 6:
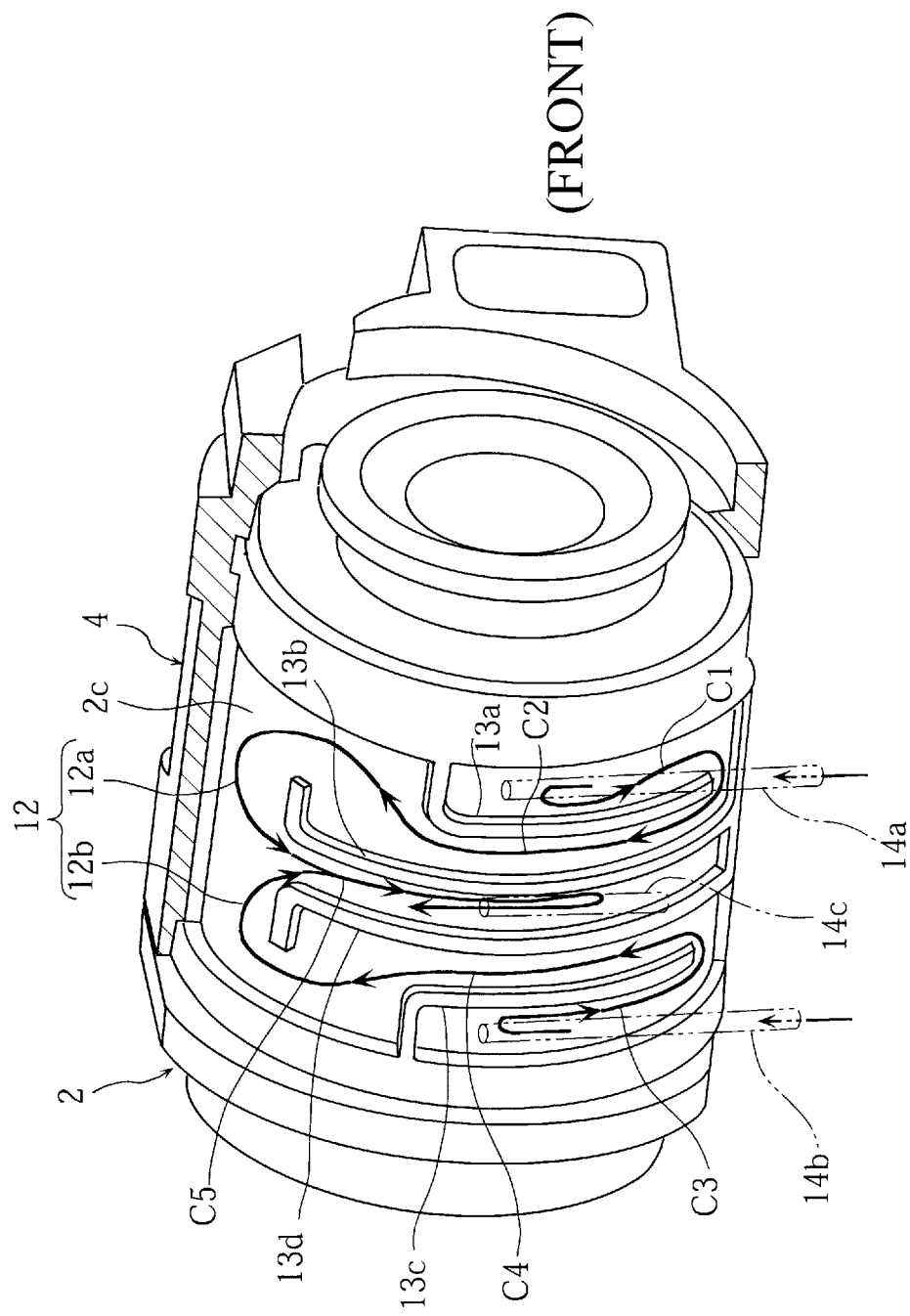
FIG. 6 is a perspective view of cooling passages of a motor accommodation section of the spindle apparatus.

Between the inner wall surface 4c of the spindle housing 4 and the outer wall surface 2c of the motor accommodation section 2, a pair of left and right cooling passages 12 and 12' for flowing cooling oils are formed. The left side cooling passage 12 is formed on the outer wall surface 2c of the motor accommodation section 2 by forming ribs 13a to 13d which are elongated protrusions on the outer wall surface 2c of the motor accommodation section 2 so as to extend in the circumferential direction thereof and bringing the inner wall surface 4c of the spindle housing 4 into contact with outer surfaces of all of the ribs. In detail, as shown in FIG. 6, the left side cooling passage 12 is constituted by the passage 12a passing between the ribs 13a and 13b and the passage 12b passing between the ribs 13c and 13d.

The right side cooling passage 12' is formed on the outer wall surface 2c of the motor accommodation section 2 by forming ribs 13a' to 13d' which are elongated protrusions on the outer wall surface 2c of the motor accommodation section 2 so as to extend in the circumferential direction thereof and bringing the inner wall surface 4c of the spindle housing 4 into contact with outer surfaces of all of the ribs. The right side cooling passage 12' is constituted by the passage 12a' passing between the ribs 13a' and 13b' and the passage 12b' passing between the ribs 13c' and 13d'.

In the passages 12a and 12b, the cooling oils start to flow from the intermediate portions of the oil supply through-holes 14a and 14b, which will be explained later, in the height direction, and cause downward flows C1 and C3 at the front and rear sides in the axial direction, respectively, and turn over at the vicinity of the top wall 5d of the cooling oil accumulation part 5 to cause upward flows C2 and C4, respectively. Then, the cooling oils join together at the axial center section to cause a downward flow C5, and then discharged through a discharge through-hole (discharge port) 14c, which will be described later. It should be noted that the cooling passage 12' formed on the opposite side of the cooling passage 12 shown in FIG. 6 has the same structure as that of the cooling passage 12. Therefore, the left side passages 12a and 12b and the right side passages 12a' and 12b' formed left/right symmetrically as seen from the front of the apparatus and front/rear symmetrically as seen from the side of the apparatus.

The cooling oil accumulation part 5 is integrally formed into a box shape having a predetermined capacity by the front and rear side walls 5a and 5a', the left and right side walls 5b and 5b' and the bottom wall 5c and the top wall 5d so as to continue to the lower section of the spindle housing 4.

Figure 7:
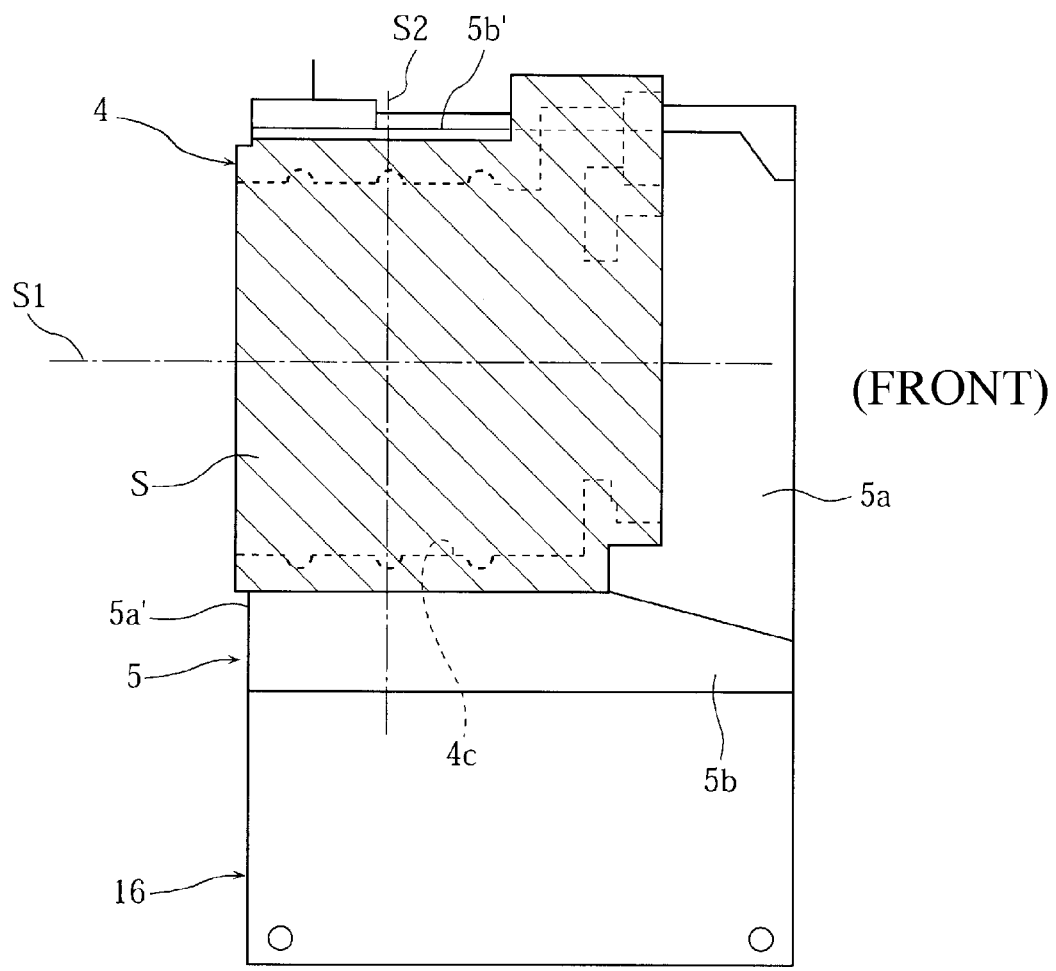
FIG. 7 is a plan schematic view of the headstock.
Figure 8:
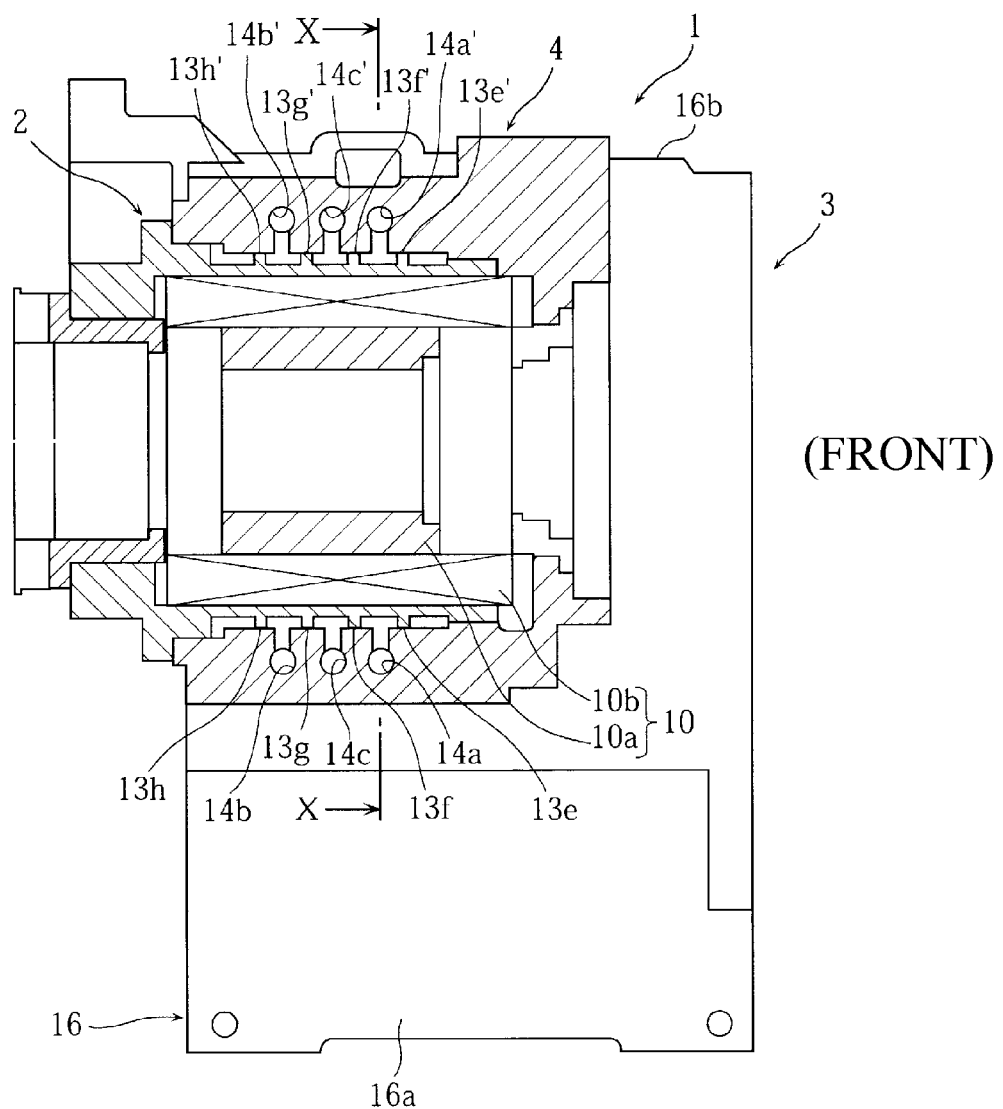
FIG. 8 is a side cross-sectional view of a spindle apparatus for a machine tool according to Embodiment 2 of the present invention.

As shown in FIG. 7, the front side wall 5a and the left side wall 5b of the cooling oil accumulation part 5 are formed into inclined surfaces positioned forward and leftward as it approaches to the lower side, respectively. Therefore, when seen from the top, the cooling oil accumulation part 5 is set to be larger in dimensions in a direction perpendicular to the axial direction and in the axial dimension than the virtual projection plane S obtained by projecting the spindle housing 4 in the vertical direction. The reference symbol "5e" denotes a reinforcing rib for securing the surface rigidity of the wall portions.

Further, the attaching section 16 is constituted by a left flange part 16a protruded from the bottom wall 5c toward the left side wall 5b side and a right flange part 16b protruded from the bottom wall 5c toward the right side wall 5b' side.

Here, the top wall 5d of the cooling oil accumulation part 5 is also used as a bottom part of the spindle housing 4, and therefore the top wall 5d covers the motor accommodation section 2 from below thereof. For this reason, the low temperature cooling oil accumulated in the cooling oil accumulation part 5 more effectively cools the lower half of the motor accommodation section 2.

The spindle housing 4 is formed into a cylindrical shape corresponding to the cylindrical shape of the motor accommodation section 2 as mentioned above, and the left and right supply/discharge parts 4d and 4d' are formed on the left and right side surfaces of the spindle housing 4 so as to increase the thickness as it advances upward. The outer surfaces a and a' of the left and right supply/discharge parts 4d and 4d' are formed into vertical surfaces. In the left supply/discharge part 4d, straight oil supply through-holes 14a and 14b communicating the inside of the cooling oil accumulation part 5 and the cooling passage 12 are formed by machining. Also in the right supply/discharge part 4d', the same oil supply through-holes 14a' and 14b' are formed by machining.

Figure 3:
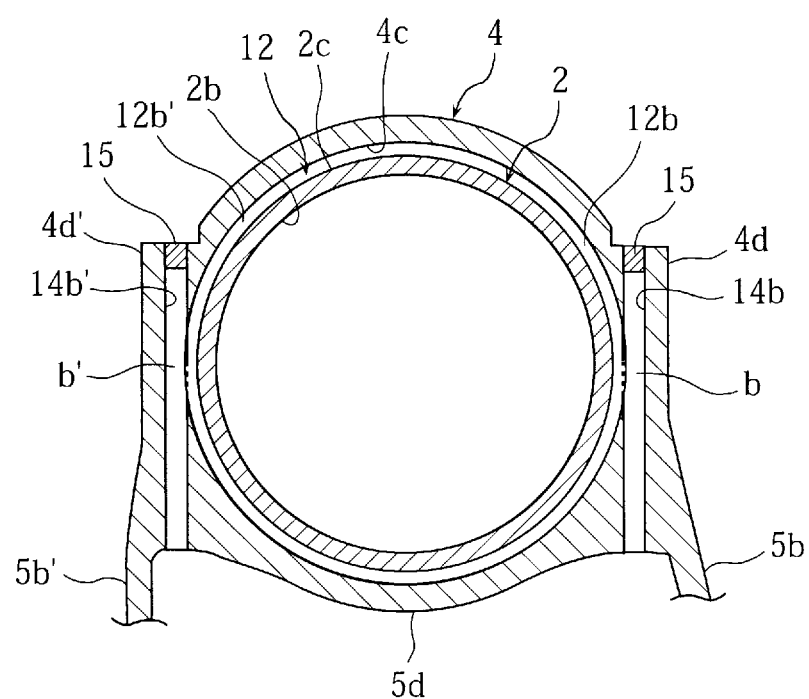
FIG. 3 is a rear cross-sectional view of the spindle apparatus (cross-sectional view taken along the line III-III in FIG. 2).
Figure 5:
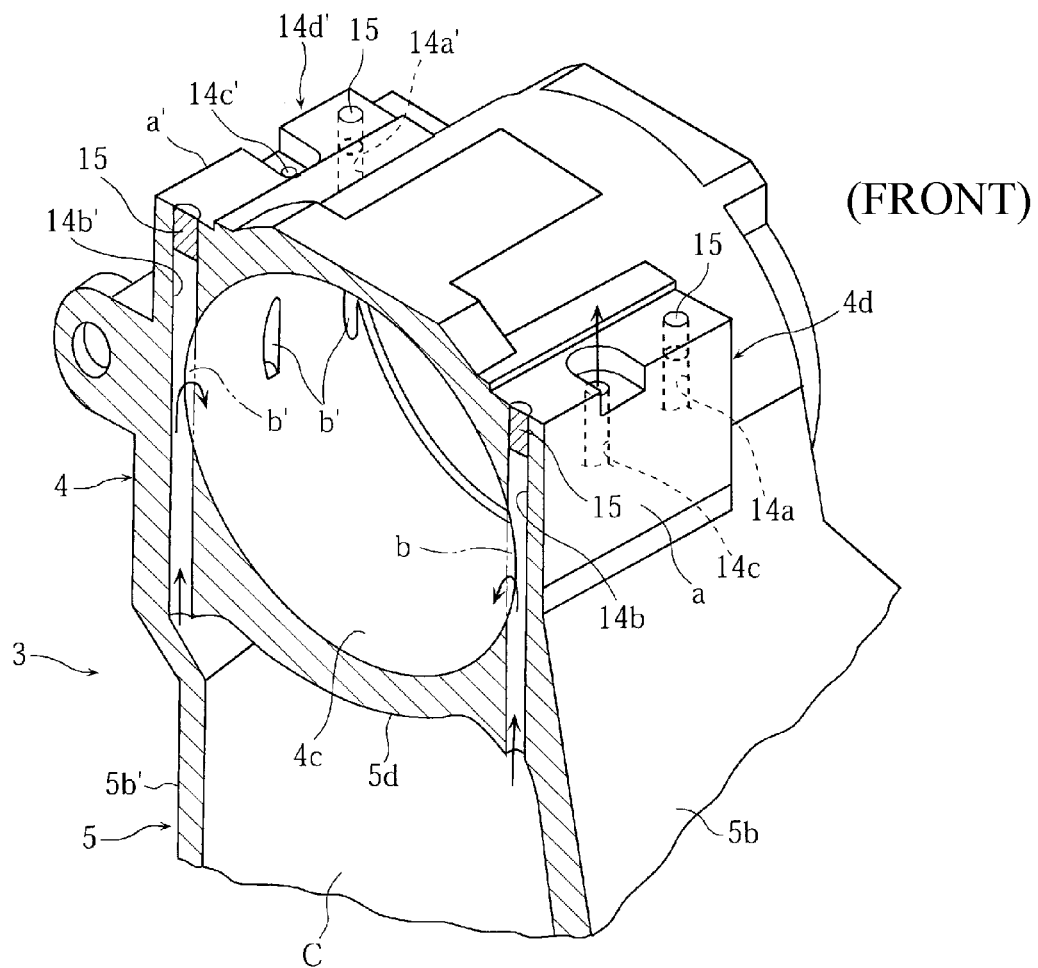
FIG. 5 a cross-sectional perspective view (cross-sectional view taken along the line V-V in FIG. 4) as seen from a rear side of the headstock.

As shown in FIGS. 3 and 5, the intermediate portion b and b' of the oil supply through-holes 14b and 14b' formed in the left and right supply/discharge parts 4d and 4d' are communicated with the portions surrounded by the ribs 13c and 13c' of the passages 12b and 12b'. Concretely, the oil supply through-holes 14b and 14b' are arranged so as to partially penetrate the passages 12b and 12b'. In other words, the oil supply through-holes 14b and 14b' are arranged so that the intermediate portions b and b' of the oil supply through-holes 14b and 14b' are partially overlapped with the passages 12b and 12b'. The oil supply through-holes 14a and 14a' and the passages 12a and 12a' are configured in the same manner as mentioned above.

Figure 4:
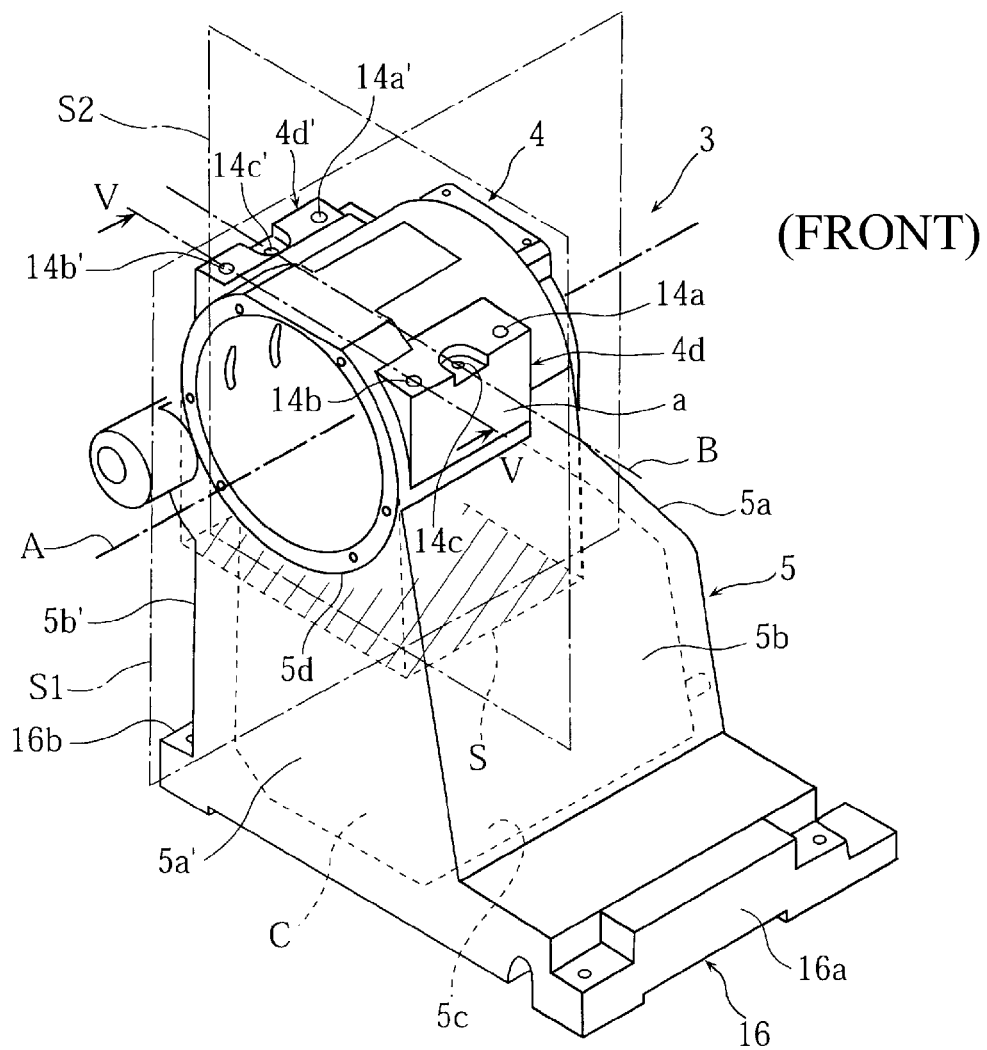
FIG. 4 is a perspective view as seen from a rear side of a headstock of the spindle apparatus.

Here, as shown in FIG. 4, the aforementioned four oil supply through-holes 14a, 14a', 14b and 14b' are formed at positions symmetrical to a first vertical plane 51 which includes the axis A of rotation of the motor 10 or the spindle 6 and is perpendicular to the virtual projection plane S and also symmetrical to a second vertical plane S2 which includes a straight line B connecting discharge through-holes 14c and 14c', which will be explained later, and is perpendicular to both the first vertical plane 51 and the second vertical plane S2 perpendicular to the virtual projection plane S. In other words, the aforementioned four oil supply through-holes 14a, 14a', 14b and 14b' are arranged left/right symmetrically as seen from the front of the apparatus and front/rear symmetrically as seen from the side of the apparatus.

Further, the upper end portions of the oil supply through-holes 14a, 14b, 14a' and 14b' are opened upward from the upper surfaces of the left and right supply/discharge parts 4d and 4d', or opened in a direction of separating from the cooling oil accumulation tank 5. In each of the openings, a plug (sealing member) 15 for sealing the opening is screwed. This plug 15 is preferably screwed after pushing out the air from each oil supply through-hole by filling the through-hole with the cooling oil, or preferably set to have a length reaching the bifurcation part of the cooling passage.

Further, in the left supply/discharge part 4d, a discharge through-hole 14c which functions as a discharge port of the cooling oil is formed so as to be positioned midway in between the oil supply through-holes 14a and 14b and in parallel to the oil supply through-holes 14a and 14b. The discharge through-hole 14c is communicated with the portion between the ribs 13b and 13d at which the passages 12a and 12b converge. In the same manner, a discharge through-hole 14c' is formed in the right supply/discharge part 4d'.

In the spindle apparatus 1 according to this Embodiment 1, the cooling oil cooled to a predetermined temperature by a cooling oil cooler, which is not illustrated, is supplied to the inside of the cooling oil accumulation part 5 and then supplied to the portions of the left cooling passage 12 surrounded by the front and rear ribs 13a and 13c through the oil supply through-holes 14a and 14b formed in the left supply/discharge part 4d. Thereafter, the cooling oils merge at the portion between the ribs 13b and 13d through the passages 12a and 12b and then are discharged through the discharge through-hole 14c. The right cooling passage 12' is the same as mentioned above.

In this Embodiment 1, the cooling oil accumulation part 5 is formed between the spindle housing 4 and the attaching section 16 so that the width dimension of the cooling oil accumulation part 5 perpendicular to the spindle 6 and the axial direction dimension thereof are larger than those of the motor accommodation section 2, and the through-holes 14a and 14b are formed. Therefore, the cooling passage 12 and the cooling oil accumulation part 5 can be communicated with each other and the storage capacity of the cooling medium C can be increased, which in turn can reduce the thermal expansion of the attaching section 16. Further, since the motor accommodation section 2 is directly cooled from the cooling oil accumulation part 5 side, the temperature raise of the cooling oil accumulation part 5 side of the spindle 6 can be suppressed. As a result, the thermal displacement of the spindle 6, or the thermal displacement of the process point, can be suppressed, which in turn can suppress adverse effects to processing precision.

Further, the headstock 3 is structured such that the cooling oil accumulation part 5 is integrally formed between the spindle housing 4 and the attaching section 16, and the straight through-holes 14a and 14b communicating the cooling oil accumulation part 5 and the cooling passage 12 are formed in the supply/discharge parts 4d and 4d' of the side wall of the spindle housing 4.

Further, the aforementioned four oil supply through-holes 14a, 14b, 14a' and 14b' are formed at positions symmetrical to the first vertical plane 51 and also symmetrical to the second vertical plane S2 and the left and right and front and rear four pairs of passages 12a, 12a', 12b and 12b' constituting the cooling passages 12 and 12' are structured to be symmetrical to both the vertical planes 51 and S2. Therefore, the cooling oil can be evenly supplied to the entire surface of the outer wall surface 2c of the motor accommodation section 2, and therefore the temperature distribution or the thermal displacement in the direction of axis of the motor accommodation section 2 and at the positional relation symmetrical to the first vertical plane 51 becomes even, which can reduce influences to processing precision.

Further, the headstock 3 includes the spindle housing 4 surrounding the outer wall surface 2c of the motor accommodation section 2 and the cooling oil accumulation part 5 integrally formed continuously from the lower part of the spindle housing 4 so as to cover the motor accommodation section 2 from below thereof. Further, between the outer wall surface 2c of the motor accommodation section 2 and the inner wall surface 4c of the spindle housing 4, the cooling passages 12 and 12' are formed. In addition, straight oil supply through-holes 14a, 14b, 14a' and 14b' communicating the cooling oil accumulation part 5 and the cooling passages 12 and 12' are formed in the supply/discharge parts 4d and 4d' of the side wall of the spindle housing 4. Therefore, by merely integrally forming the motor accommodation section 2 and the headstock 3 by casting, forming the oil supply through-holes 14a, 14b, 14a' and 14b' in the supply/discharge parts 4d and 4d' of the headstock 3 by machining, etc., and assembling the motor accommodation section 2 in which the spindle 6 and the motor 10 are assembled in the spindle housing 4 of the headstock 3, the spindle apparatus 1 can be structured without causing complication of the mold structure, which in turn can improve the productivity.

Further, cooling passages 12 and 12' are formed by forming the ribs 13a to 13d, 13a' to 13d', and 13b on the outer wall surface 2c of the motor accommodation section 2 and covering the ribs by the spindle housing 4. Therefore, by arbitrarily setting the configuration of the rib, the cooling passages can be formed freely, which enables to improve the degree of freedom of the cooling passage design.

Further, since it is structured such that the top wall 5d of the cooling oil accumulation part 5 covers the motor accommodation section 2 from below thereof, especially the lower portion of the motor accommodation section 2 can be effectively cooled by the low temperature cooling oil filling the inside of the cooling oil accumulation part 5. This can reduce the temperature raise of the structural parts below the spindle 6, and therefore the thermal displacement of the height position of the spindle 6 or the processing point can be suppressed, which in turn can suppress adverse influences to processing precision.

Further, the passages 12a and 12b constituting the cooling passage 12 are structured to invert the flows C1 and C3 directed downward from the oil supply through-holes 14a and 14b at the front and rear sides in the axial direction at the vicinity of the top wall 5d into the flows C2 and C4 directed upward at the inner sides of the direction of axis. Therefore, the amount of the cooling oil contacting the lower portion of the motor accommodation section 2 can be increased. Also from this viewpoint, the lower portion of the motor accommodation section 2 can be effectively cooled, and therefore the thermal displacement of the height position of the spindle 6 or the processing point can be suppressed, which in turn can suppress adverse influences to processing precision.

Furthermore, since the upper end portion of the oil supply through-holes 14a and 14b are opened upward from the upper surface of the supply/discharge part 4d of the spindle housing 4, the oil supply through-holes 14a and 14b can be easily formed by machining, which can avoid complication of the mold structure. Further, since the discharge through-hole 14c is formed in parallel to the oil supply through-holes 14a and 14b, this discharge through-hole 14c can also be simultaneously formed with the oil supply through-hole by machining.

Further, when the air in the oil supply through-holes 14a and 14b is pushed out by filling the through-holes with the cooling oil and the opening is screwed by the plug 15, disturbance of the cooling oil flow due to the accumulated air can be prevented. Also from this viewpoint, the motor accommodation section 2 can be evenly cooled.

The plug 15 can be set to have a length reaching the bifurcation part of the cooling passage of the oil supply through-hole. This enables prevention of turbulence of the cooling oil flow due to the accumulated air without requiring the air releasing operation.

Further, since the discharge through-hole 14c is provided at the position symmetrical to the first vertical plane 51. Therefore, also from this viewpoint, the flow of the cooling oil can be evenly formed at the left, right, front and rear of the motor accommodation section 2. Further, since there is no need to provide a cooling oil discharging piping at the upper portion of the spindle housing 4, the upper portion of the spindle housing 4 can be utilized as a part arrangement space.

Embodiment 2

FIGS. 8 to 13 are drawings for explaining Embodiment 2 of the present invention. In the drawings, the same symbol as that in FIGS. 1 to 7 denotes the same or corresponding portion.

Figure 9:
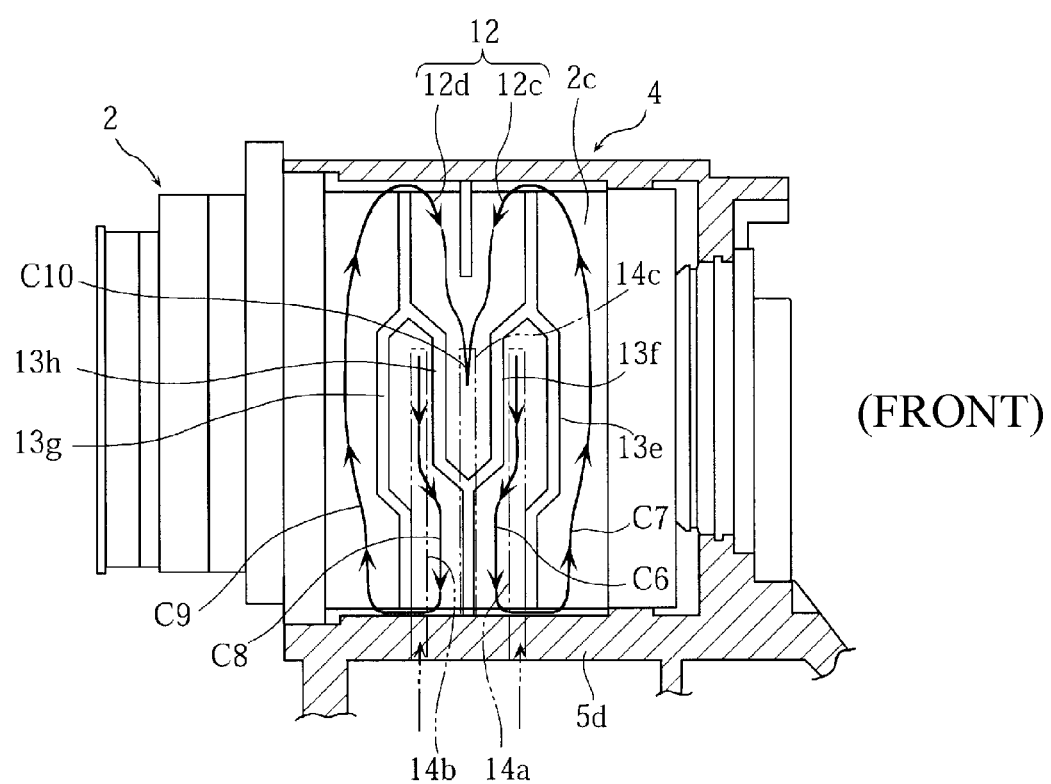
FIG. 9 is a side view of cooling passages of the spindle apparatus.

In Embodiment 2, the cooling passage 12 is formed on the outer wall surface 2c of the motor accommodation section 2 by forming ribs 13e, 13f, 13g and 13h which are elongated protrusions on the outer wall surface 2c of the motor accommodation section 2 so as to extend in the circumferential direction thereof and bringing the inner wall surface 4c of the spindle housing 4 into contact with outer surfaces of all of the ribs. In detail, as shown in FIG. 9, the cooling passage 12 is constituted by the passage 12c formed by the ribs 13e and 13f and the passage 12d formed by the ribs 13g and 13h.

In the passages 12c and 12d, the cooling oils start to flow from the oil supply through-holes 14a and 14b, and cause downward flows C6 and C8 at the intermediate side in the axial direction, respectively, and turn over at the vicinity of the top wall 5d to cause upward flows C7 and C9, respectively. Then, the cooling oils join together at the axial center section to cause a flow C10, and then discharged through a discharge through-hole (discharge port) 14c. It should be noted that a cooling passage 12' having the same passages is formed on the opposite side of the cooling passage 12 shown in FIG. 9. Therefore, the left side passages 12c and 12d and the right side passages 12c' and 12d' are formed left/right symmetrically as seen from the front of the apparatus and front/rear symmetrically as seen from the side of the apparatus.

Figure 10:
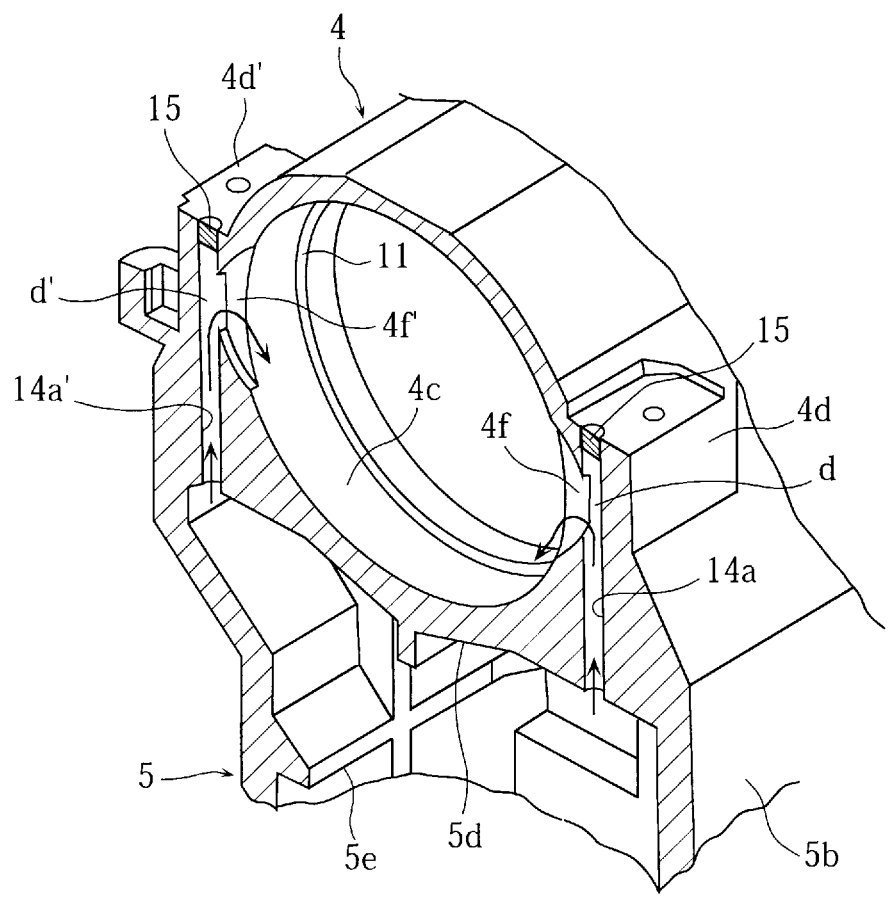
FIG. 10 is a cross-sectional perspective view (perspective cross-sectional view taken along the line X-X in FIG. 8) of a connection portion of a through-hole and a cooling passage of the spindle apparatus.
Figure 11:
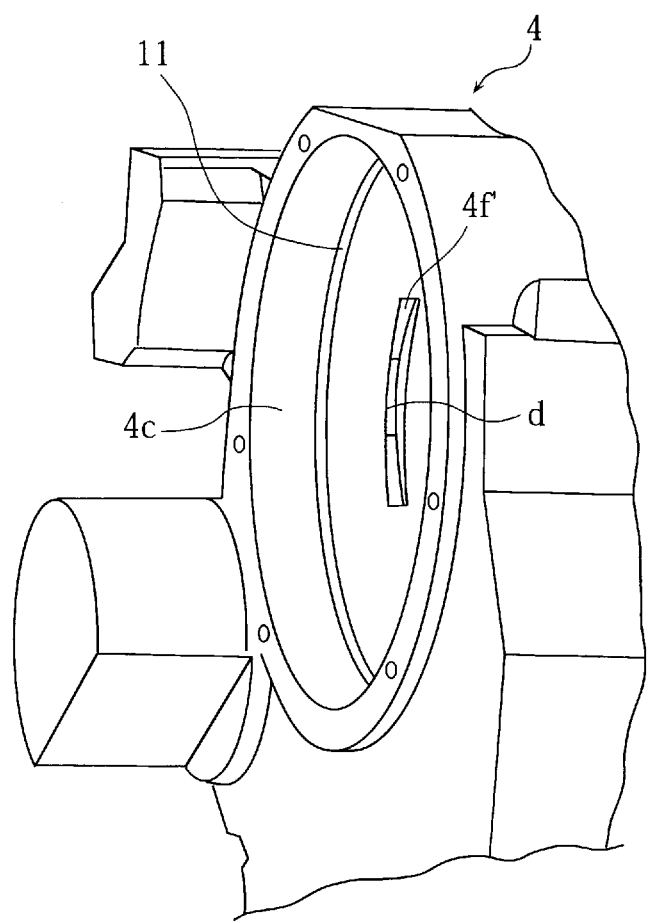
FIG. 11 is a perspective view of a connection aperture portion of the spindle apparatus.
Figure 12:
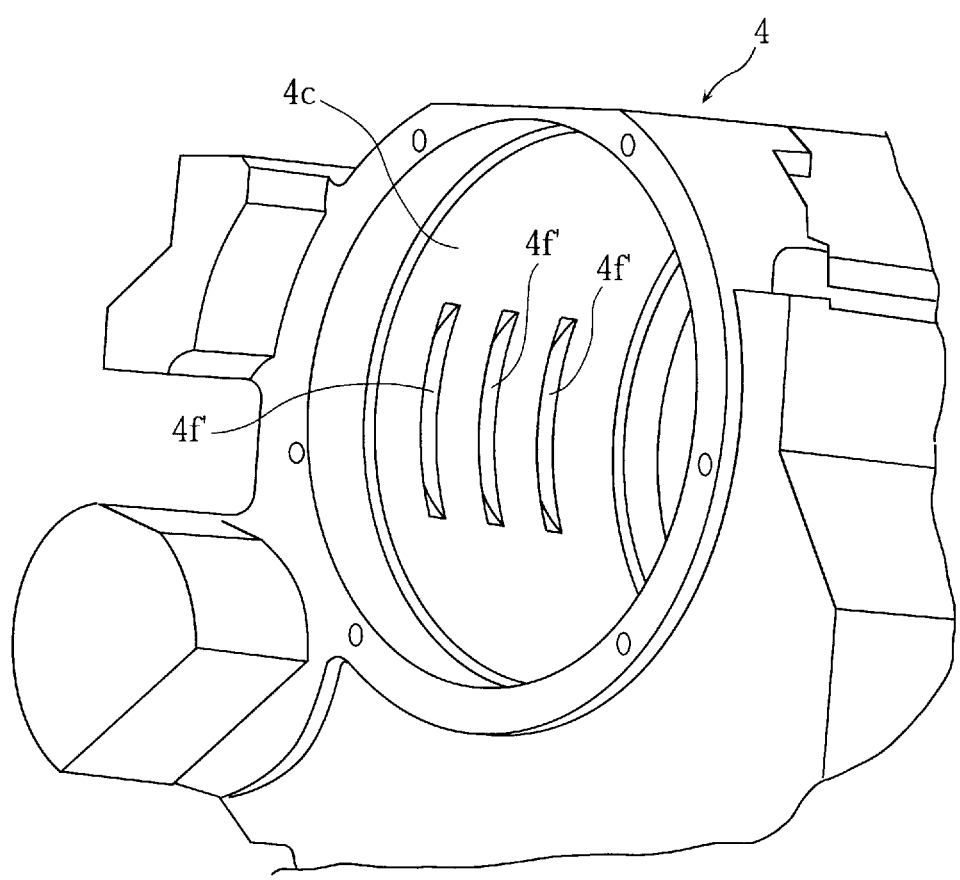
FIG. 12 is a perspective view of the connection aperture portion of the spindle apparatus.
Figure 13:
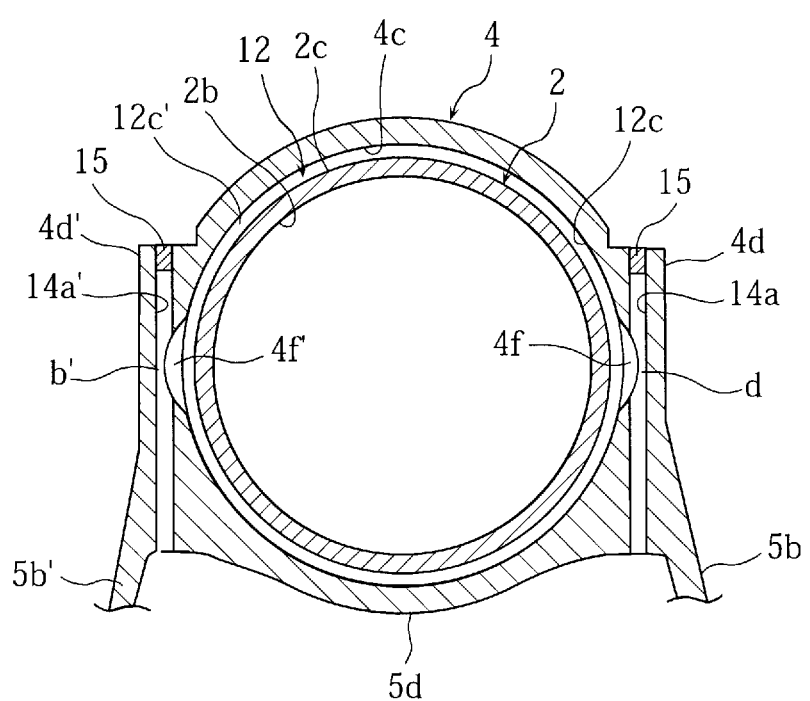
FIG. 13 is a cross-sectional rear view (perspective cross-sectional rear view taken along the line X-X in FIG. 8) of a connection portion of a through-hole and a cooling passage of the spindle apparatus.

Further, in this Embodiment, as shown in FIGS. 10 and 13, the intermediate portion d of the oil supply through-hole 14a is communicated with the portion surrounded by the ribs 13e and 13f of the passage 12c via the connection aperture 4f. In the same manner, the intermediate portion d' of the oil supply through-hole 14a' is communicated with the portion surrounded by the ribs 13e' and 13f' of the passage 12c' via the connection aperture 4f'.

Concretely, the oil supply through-holes 14a and 14a' are formed so as to penetrate the portions slightly separated from the passages 12c and 12c' radially outward. The connection apertures 4f and 4f' are vertically extended crescent shaped slits each having a depth reaching the through-holes 14a and 14a' and formed at the positions corresponding to the intermediate portions d and d' of the inner wall surface 4c of the spindle housing 4. The bottom portions of the slits are opened in the through-holes 14a and 14a'. The through-holes 14b and 14b' and the passages 12d and 12d' are communicated with each other in the same connection structure.

In this Embodiment 2, since the through-holes 14a, 14b, 14a' and 14b' are formed so as to separate outward from the inner wall surface 4c of the spindle housing 4, a necessary thickness can be secured therebetween, which can prevent the problem of strength poverty.

Further, the passages 12c and 12d constituting the cooling passage 12 are structured to invert the flows C6 and C8 directed downward from the oil supply through-holes 14a and 14b at the central sides in the axial direction at the vicinity of the top wall 5d into the flows C7 and C9 directed upward at the front and rear sides of the direction of axis. Therefore, the amount of the low temperature cooling oil contacting the lower portion of the motor accommodation section 2 can be increased. Also from this viewpoint, the lower portion of the motor accommodation section 2 can be effectively cooled, and therefore the thermal displacement of the height position of the spindle 6 or the processing point can be suppressed, which in turn can suppress adverse influences to processing precision.

In the aforementioned Embodiments 1 and 2, the cooling oils are merged by the passages 12a and 12b or 12c and 12d, and then discharged. However, in the present invention, the cooling oil can be discharged independently from each passage without merging. In this case, it is preferable that the discharge ports be arranged at positions symmetrical to both the first and second vertical planes. With this, the discharge ports are symmetrically arranged in the left and right and front and rear, resulting in an even flow of the cooling oil.

Further, in the aforementioned Embodiments 1 and 2, although the explanation is directed to the case in which the spindle is arranged horizontally, the present invention can also be applied to the case in which the spindle is arranged vertically.

The terms and descriptions used herein are used only for explanatory purposes and the present invention is not limited to them. Accordingly, the present invention allows various design-changes falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, the terminology "present invention" or "invention" is meant as a non-specific, general reference and may be used as a reference to one or more aspects within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A spindle apparatus of a machine tool, comprising:
a motor configured to rotatably drive a spindle;
a motor accommodation section having a cylindrical inner wall surface configured to accommodate the motor;
a headstock including a spindle housing fixed to an outer wall surface of the motor accommodation section so as to surround the outer wall surface to form a cooling passage for passing a cooling medium between an inner wall surface of the spindle housing and the outer wall surface of the motor accommodation section and an attaching section configured to be attached to a moving member or a fixed member; and
a cooling medium accumulation part being integrally formed with the spindle housing and the attaching section between the spindle housing and the attaching section, the cooling medium accumulation part having a box shape and including a top wall, a bottom wall and side walls configured on the attaching section, the top wall having a first inner surface, the bottom wall having a second inner surface, and the side walls having third to sixth inner surfaces, the box shape being formed by the first to sixth inner surfaces, most part of the cooling medium accumulation part being beneath the headstock, wherein
at least a width of the cooling medium accumulation part in a direction perpendicular to the spindle is wider than a width of the motor accommodation section in a virtual projection plane obtained by projecting the cooling medium accumulation part in a direction from the spindle housing to the attaching section,
a straight through-hole communicating the cooling medium accumulation part and the cooling passage directly is formed in a side wall part of the spindle housing, and
the cooling passage is bisected at a middle of the straight through-hole.

2. The spindle apparatus of a machine tool as recited in claim 1, wherein
the straight through-hole is formed at four positions symmetrical to a first vertical plane perpendicular to the virtual projection plane and including an axis of rotation of the motor and also symmetrical to a second vertical plane perpendicular to the first vertical plane and perpendicular to the virtual projection plane.

3. The spindle apparatus of a machine tool as recited in claim 1,
  wherein the cooling passage is formed so as to diverge at an intermediate portion of the straight through-hole,
  wherein one end portion of the straight through-hole is opened in a direction of separating from the cooling medium accumulation part, and
  wherein a sealing member for sealing the opening is arranged in the opening.

4. The spindle apparatus of a machine tool as recited in claim 2, further comprising
  discharge ports for discharging the cooling medium at portions on the second vertical plane and symmetrical to the first vertical plane, or positions symmetrical to both the second vertical plane and the first vertical plane.

5. The spindle apparatus of a machine tool as recited in claim 1, wherein
  the cooling passage is formed on the outer wall surface of the motor accommodation section by forming ribs on the outer wall surface of the motor accommodation section so as to extend in a circumferential direction thereof and bringing the inner wall surface of the spindle housing into contact with outer surfaces of the ribs.

6. The spindle apparatus of a machine tool as recited in claim 1, wherein
  the cooling medium accumulation part is formed between the spindle housing and the attaching section so that a width dimension of the cooling medium accumulation part perpendicular to the spindle and an axial direction dimension thereof are larger than those of the motor accommodation section.

7. The spindle apparatus of a machine tool as recited in claim 1, further comprising
  a discharge through-hole formed in the side wall part of the spindle housing in parallel to the straight through-hole.

8. The spindle apparatus of a machine tool as recited in claim 1, wherein
  the cooling passage is formed left/right symmetrically as seen from a front of the apparatus and front/rear symmetrically as seen from a side of the apparatus.

9. The spindle apparatus of a machine tool according to claim 1, wherein
  the straight through-hole extends in the side wall part of the spindle housing in a vertical direction perpendicular to the spindle to a top of the spindle housing.

10. The spindle apparatus of a machine tool according to claim 1, wherein
  the cooling medium is accumulated in a space formed by the first to sixth inner surfaces.

* * * * *